(12) United States Patent
Ye et al.

(10) Patent No.: US 7,825,539 B2
(45) Date of Patent: Nov. 2, 2010

(54) ELECTRONIC DEVICE WITH POWER CONNECTION MODULE

(75) Inventors: Zhen-Xing Ye, Shenzhen (CN); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 47 days.

(21) Appl. No.: 12/277,251

(22) Filed: Nov. 24, 2008

(65) Prior Publication Data
US 2010/0072820 A1 Mar. 25, 2010

(30) Foreign Application Priority Data
Sep. 25, 2008 (CN) .................. 2008 1 0304679

(51) Int. Cl.
*H02J 1/10* (2006.01)
(52) U.S. Cl. .......................... 307/52; 307/44
(58) Field of Classification Search .............. 307/52
See application file for complete search history.

(56) References Cited

U.S. PATENT DOCUMENTS 4,241,372 A * 12/1980 Sears .................... 361/72
4,638,175 A * 1/1987 Bradford et al. ............ 307/64
5,355,073 A * 10/1994 Nguyen .................. 320/116
5,388,022 A * 2/1995 Ahuja ..................... 361/94
5,612,580 A * 3/1997 Janonis et al. ............. 307/64
6,087,039 A * 7/2000 Van Lerberghe ........... 429/150
6,130,813 A * 10/2000 Kates et al. .............. 361/93.1
6,621,259 B2 * 9/2003 Jones et al. ............ 324/123 C
6,754,092 B2 * 6/2004 McDowell et al. ........... 363/89
7,635,925 B2 * 12/2009 Frew et al. ................ 307/52
7,667,350 B2 * 2/2010 Norimatsu et al. ........... 307/87
2004/0053082 A1 * 3/2004 McCluskey et al. ........... 429/9
2005/0213277 A1 * 9/2005 Vierling et al. ............. 361/152

* cited by examiner

Primary Examiner—Jared Fureman
Assistant Examiner—Adi Amrany
(74) Attorney, Agent, or Firm—Zhigang Ma

(57) ABSTRACT

An electronic device includes a first power supply unit, a second power supply unit, and a control circuit. The control circuit connected between the first power supply unit and the second power supply unit is configured for detecting an output power of the first power supply unit, and comparing the output power with a rated power of the first power supply unit. When the output power exceeds the rated power of the first power supply unit, the control circuit allows the second power supply unit to power the electronic device.

11 Claims, 3 Drawing Sheets

ELECTRONIC DEVICE WITH POWER CONNECTION MODULE

BACKGROUND

1. Technical Field

The present disclosure relates to electronic devices, and particularly to an electronic device with a power connection module.

2. Description of the Related Art

Generally, power supplies for electronic devices are designed to supply just enough power for anticipated needs. However, with the rapid development of science and technology, peripherals are more commonly added to existing system changing power requirements in an unanticipated manner. Therefore, the power supply must be replaced by a new power supply that satisfies the new requirements of the electronic device, which is costly.

DETAILED DESCRIPTION

Figure 1:
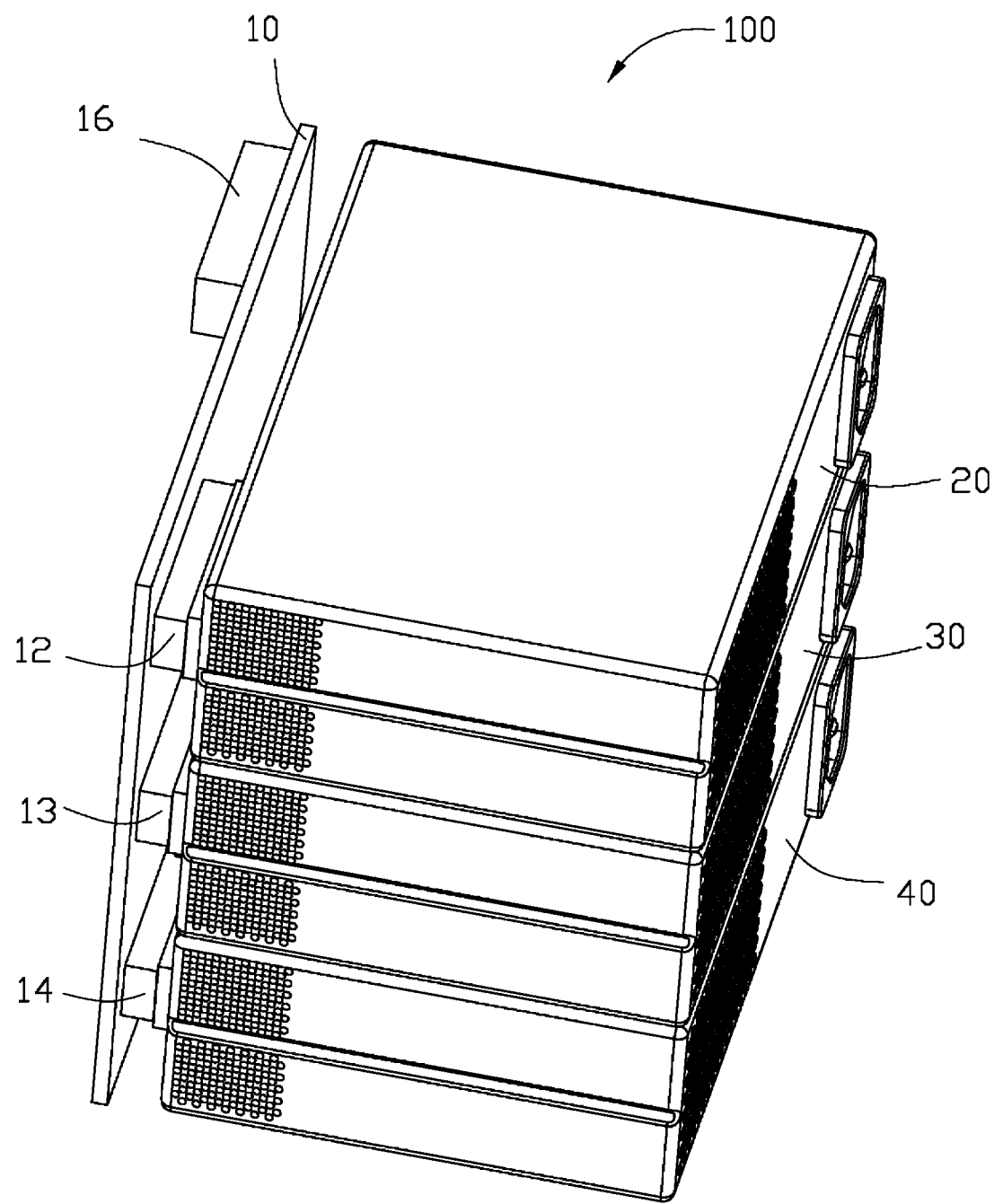
FIG. 1 is a partial schematic view of an embodiment of an electronic device including a power connection module and a plurality of power supply units.

Referring to FIG. 1, an embodiment of an electronic device, such as a desktop computer, a notebook computer, or a server, includes a power connection module 100. The power connection module 100 includes a midplane 10 with three input connectors 12, 13, 14 on one surface of the midplane 10, and an output connector 16 on an opposite surface of the midplane 10. The input connector 12 is configured for connecting to a power supply unit 20. The input connector 13 is configured for connecting to a power supply unit 30. The input connector 14 is configured for connecting to a power supply unit 40. The output connector 16 is configured for connecting and supplying power to a load (not shown). The power supply units 20-40 have similar structures and are configured for transforming an external power source to a variety of voltage signals as needed by the load. One of the power supply units 20-40 is designated as a master power supply unit, and other power supply units are handled as expansion power supply units. In one embodiment, the power supply unit 20 is the master power supply unit, the power supply units 30 and 40 are the expansion power supply units, and the midplane 10 is a printed circuit board. In other embodiments, the number of the power supply units can be varied according to actual need, and the number of the input connectors on the midplane 10 can be varied correspondingly.

Figure 2:
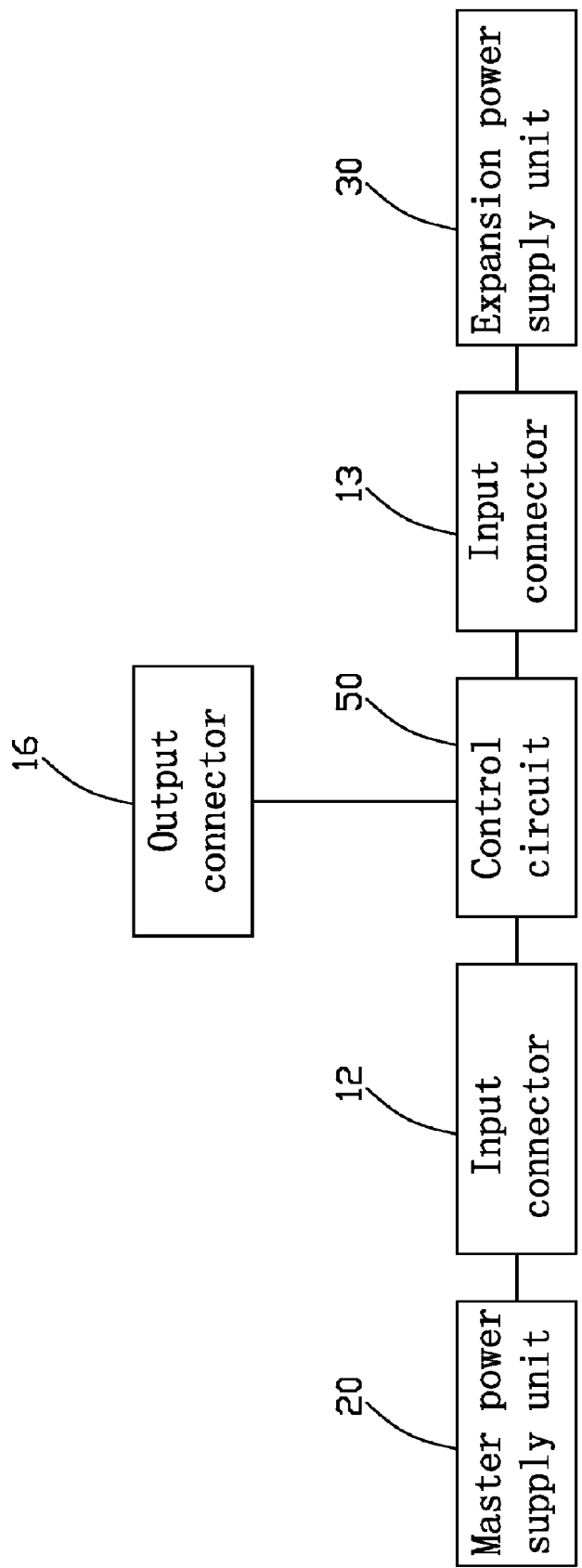
FIG. 2 is a block diagram of the power connection module connected between two power supply units of FIG. 1.
Figure 3:
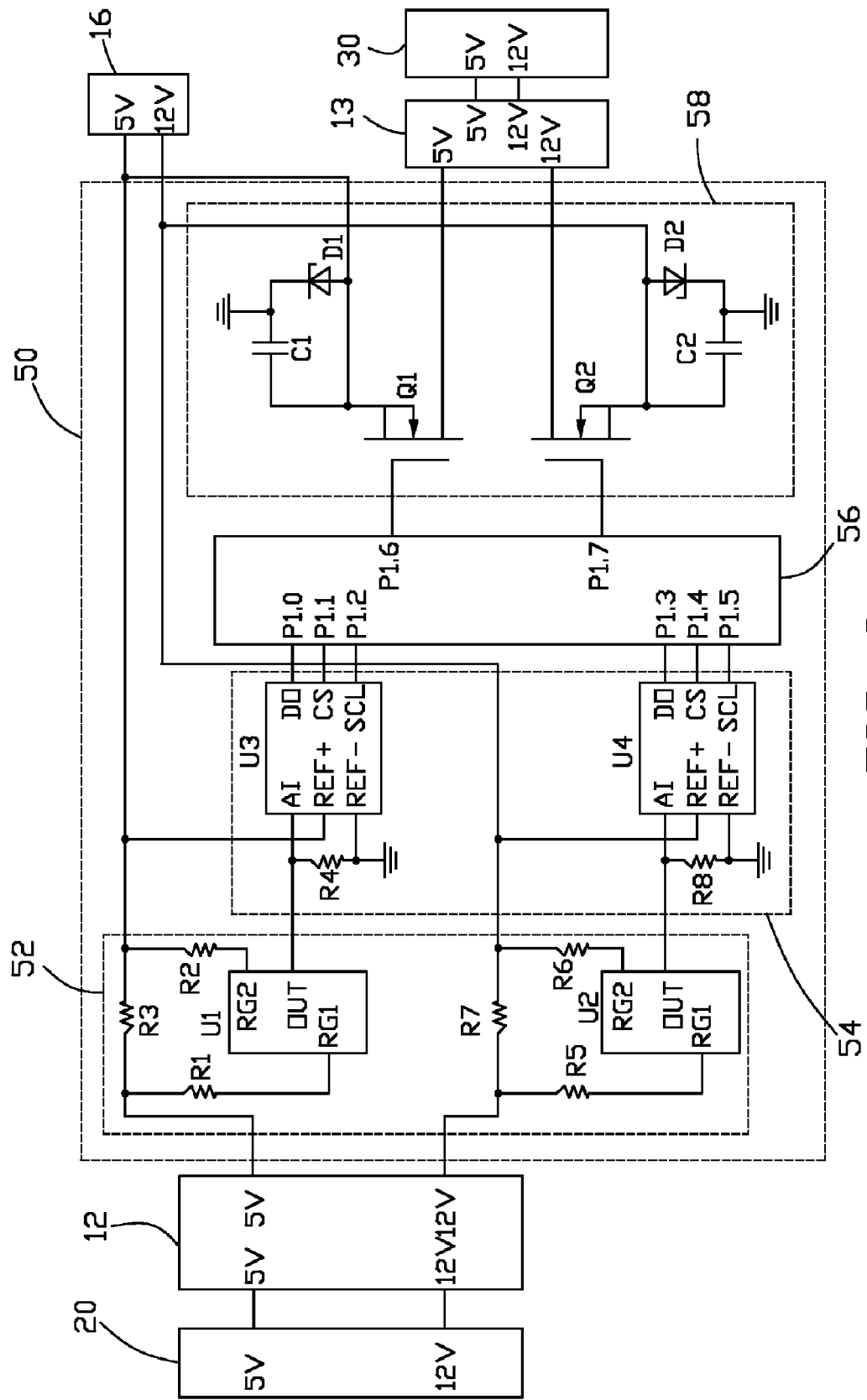
FIG. 3 is one embodiment of a circuit diagram of FIG. 2.

The midplane 10 includes a plurality of control circuits, each of the control circuits are connected among every two adjacent input connectors and the output connector 16. In one embodiment, a control circuit 50 connected among the input connectors 12 and 13, and the output connector 16 is taken as an example. Referring to FIGS. 2 and 3, the control circuit 50 includes a detecting unit 52, an analog-to-digital converting unit 54, a microcontroller 56, and a switch unit 58. The control circuit 50 is configured for detecting current power demand of the load, and adjusting the number of the power supply units supplying power accordingly, to fulfill the demand.

The detecting unit 52 includes a first current detector U1, a second current detector U2, and six resistors R1-R3 and R5-R7. The analog-to-digital converting unit 54 includes a first analog to digital converter (ADC) U3, a second ADC U4, and two resistors R4 and R8. The switch unit 58 includes a first electric switch Q1, a second electric switch Q2, two capacitors C1 and C2, and two diodes D1 and D2. The first and second current detectors U1, U2 are MAX472 amplifiers from the Maxim Integrated Products company in one embodiment. The first and second ADCs U3, U4 are TCL549 ADCs from the Texas Instruments company in one embodiment. The first and second electric switches Q1, Q2 are N-channel metal-oxide-semiconductor field-effect transistors (N-MOSFETs), the capacitors C1 and C2 are filtering capacitors, and the diodes D1 and D2 are zener diodes. The number of the current detectors, ADCs, and electric switches can be varied according to the number of different voltage signals output by a power supply unit. In one embodiment, the master power supply unit 20 and the expansion power supply units 30, 40 each output 5V and 12V signals, therefore, there are three each of current detectors, ADCs, and electric switches.

A first terminal of the resistor R3 receives the 5V signal output by the master power supply unit 20 via the input connector 12, and is connected to a first gain resistor pin RG1 of the first current detector U1 via the resistor R1. A second terminal of the resistor R3 is connected to a 5V pin of the output connector 16, and connected to a second gain resistor pin RG2 of the first current detector U1 via the resistor R2. A first terminal of the resistor R7 receives the 12V signal output by the master power supply unit 20 via the input connector 12, and is connected to a first gain resistor pin RG1 of the second current detector U2 via the resistor R5. A second terminal of the resistor R7 is connected to a 12V pin of the output connector 16, and connected to a second gain resistor pin RG2 of the second current detector U2 via the resistor R6.

Each of the first and second ADCs U3 and U4 includes an analog signal input pin AI, a positive reference voltage pin REF+, a negative reference voltage pin REF−, a digital signal output pin DO, a chip selection signal pin CS, and a clock signal pin SCL. The analog signal input pin AI of the first ADC U3 is connected to an output pin OUT of the first current detector U1, and is grounded via the resistor R4. The positive reference voltage pin REF+ of the first ADC U3 is connected to a node between the resistor R2 and the resistor R3. The negative reference voltage pin REF− of the first ADC U3 is grounded. The digital signal output pin DO of the first ADC U3 is connected to a pin P1.0 of the microcontroller 56. The chip selection signal pin CS of the first ADC U3 is connected to a pin P1.1 of the microcontroller 56. The clock signal pin SCL of the first ADC U3 is connected to a pin P1.2 of the microcontroller 56. The analog signal input pin AI of the second ADC U4 is connected to an output pin OUT of the second current detector U2, and grounded via the resistor R8. The positive reference voltage pin REF+ of the second ADC U4 is connected to a node between the resistor R6 and the resistor R7. The negative reference voltage pin REF− of the second ADC U4 is grounded. The digital signal output pin DO of the second ADC U4 is connected to a pin P1.3 of the microcontroller 56. The chip selection signal pin CS of the second ADC U4 is connected to a pin P1.4 of the microcontroller 56. The clock signal pin SCL of the second ADC U4 is connected to a pin P1.5 of the microcontroller 56.

The following describes how the control circuit 50 is connected to the expansion power supply unit 30. The gate of the N-MOSFET Q1 is connected to a pin P1.6 of the microcontroller 56. The drain of the N-MOSFET Q1 receives the 5V signal outputted by the expansion power supply unit 30 via the input connector 13. The source of the N-MOSFET Q1 is connected to the 5V pin of the output connector 16, connected to the anode of the zener diode D1, and grounded via the capacitor C1. The cathode of the zener diode D1 is grounded. The gate of the N-MOSFET Q2 is connected to a pin P1.7 of the microcontroller 56. The drain of the N-MOSFET Q2 receives the 12V signal outputted by the expansion power supply unit 30 via the input connector 13. The source of the N-MOSFET Q2 is connected to the 12V pin of the output connector 16, connected to the anode of the zener diode D2, and grounded via the capacitor C2. The cathode of the zener diode D2 is grounded.

Generally, a variety of voltages may be supplied, such as a 5V standby voltage $5V_{13}SB$, a 5V system voltage $5V_{13}SYS$, and a 3.3V system voltage $3.3V_{13}SYS$, as needed by the load, by converting the 5V and 12V signals with the converting circuit in the power supply unit. If the 5V and 12V outputs of the power supply unit exceed their rated powers, which indicates the power supply unit is in an overloaded state, the output of the power supply unit cannot satisfy the demand of the load, and a new power supply unit having a greater rated power is needed.

In use, the first current detector U1 is configured for receiving an operating current signal of the 5V signal of the master power supply unit 20 via a 5V pin of the input connector 12, and transforming the operating current signal into an analog voltage signal. The value of the analog voltage signal varies linearly with the value of the operating current signal. In one embodiment, the value of the analog voltage signal is equal to the value of the operating current signal of the 5V signal of the master power supply unit 20.

The first ADC U3 is configured to receive the analog voltage signal from the first current detector U1 and convert the analog voltage signal to a digital signal indicating the value of the analog voltage signal. The digital signal also indicates the value of the operating current signal because the value of the analog voltage signal varies linearly with or equals to the value of the operating current signal.

The digital signal is transmitted to the microcontroller 56 which is programmable and stores a plurality of predetermined programs. The 5V signal of the master power supply unit 20 is constant, so the microcontroller 56 is programmed to multiply the 5V signal by the digital signal from the first ADC U3 to determine an instantaneous output power of the 5V signal. The instantaneous output power of the 5V signal is compared with a rated power stored in the microcontroller 56. If the instantaneous output power exceeds the rated power, which indicates the output power of the 5V signal cannot satisfy the demand of the load, the pin P1.6 of the microcontroller 56 outputs a high level signal to turn on the N-MOSFET Q1. Therefore, a 5V signal of the expansion power supply unit 30 is output to the 5V pin of the output connector 16 via the input connector 13 and the N-MOSFET Q1 to supply power to the electronic device load.

The second current detector U2, the second ADC U4, the microcontroller 56, and the N-MOSFET Q2 will work together as the same principle and process as mentioned above, to accomplish detecting whether an output power of a 12V signal of the master power supply unit 20 satisfy the demand of the load, and determining whether brings in a 12V signal of the expansion power supply unit 30 accordingly. The expansion power supply unit 30 is connected to the expansion power supply unit 40 via a control circuit as the same way as the master power supply unit 20 is connected to the expansion power supply unit 30 via the control circuit 50.

The electronic device with the power connection module can adjust the number of the power supply units brought in, to satisfy the demand for electricity without purchasing a new power supply device to replace the existing power supply, which saves resources, and decreases costs.

It is to be understood, however, that even though numerous characteristics and advantages of the present disclosure have been set fourth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
    a first power supply unit;
    a second power supply unit;
    a control circuit connected between the first power supply unit and the second power supply unit, capable of determining whether to receive power from the second power supply unit to cooperatively power a load with first power supply unit, the control circuit comprising:
        a detecting unit receiving an operating current signal of the first power supply unit, and transforming the operating current signal into an analog voltage signal;
        an analog-to-digital converting unit transforming the analog voltage signal into a digital signal;
        a microcontroller calculating a value of an output power of the first power supply unit according to the digital signal, and comparing the output power with a rated power of the first power supply unit; and
        a switch unit;
        wherein the microcontroller turns on the switch unit to allow the second power supply unit to power the load in response to the output power exceeding the rated power of the first power supply unit; and
    an output connector configured for connecting and supplying power to the load;
    wherein the detecting unit comprises a current detector comprising:
        a first gain resistor pin receiving a first voltage signal from the first power supply unit via a first resistor;
        a second gain resistor pin receiving the first voltage signal from the first power supply via a second resistor and a third resistor connected in series, and connected to the output connector via the second resistor; and
        an output pin connected to the analog-to-digital converting unit; and
    wherein the analog-to-digital converting unit comprises an analog to digital converter (ADC) comprising:
        an analog signal input pin connected to the output pin of the current detector, and grounded via a fourth resistor;
        a positive reference voltage pin connected to a node between the second resistor and the third resistor;
        a negative reference voltage pin grounded;
        a digital signal output pin connected to a first pin of the microcontroller;
        a chip selection signal pin connected to a second pin of the microcontroller; and
        a clock signal pin connected to a third pin of the microcontroller.

2. The electronic device of claim 1, wherein the switch unit comprises an electric switch comprising:
    a first terminal connected a fourth pin of the microcontroller;
    a second terminal receiving a second voltage signal from the second power supply unit; and a third terminal connected to the output connector;
wherein the fourth pin of the microcontroller outputs a control signal to turn on the electric switch in response to the output power exceeding the rated power of the first power supply unit.

3. The electronic device of claim 2, wherein the switch unit further comprises a diode, the third terminal of the electric switch is connected to an anode of the diode, and grounded via a capacitor; a cathode of the diode is grounded.

4. The electronic device of claim 3, wherein the electric switch is an N-channel metal-oxide-semiconductor field-effect transistor (N-MOSEFT); the first terminal of the electric switch is a gate of the N-MOSEFT; the second terminal of the electric switch is a drain of the N-MOSEFT; and the third terminal of the electric switch is a source of the N-MOSEFT.

5. The electronic device of claim 3, wherein the diode is a zener diode.

6. A power connection module for supplying power to a load, the power connection module comprising:
  a midplane comprising a first input connector, a second input connector, and an output connector connecting to the load;
  a first power supply unit connected to the first input connector;
  a second power supply unit connected to the second input connector; and
  a control circuit connected between the first input connector and the second input connector, capable of determining whether to receive power from the second power supply unit to cooperatively power the load with first power supply unit, the control circuit comprising:
    a detecting unit receiving an operating current signal of the first power supply unit, and transforming the operating current signal into an analog voltage signal;
    an analog-to-digital converting unit transforming the analog voltage signal into a digital signal;
    a microcontroller calculating a value of an output power of the first power supply unit according to the digital signal, and comparing the output power with a rated power of the first power supply unit; and
    a switch unit;
  wherein the microcontroller turns on the switch unit to allow the second power supply unit to power the load in response to the output power exceeding the rated power of the first power supply unit;
  wherein the detecting unit comprises a current detector comprising:
    a first gain resistor pin receiving a first voltage signal form the first power supply unit via a first resistor;
    a second gain resistor pin receiving the first voltage signal form the first power supply via a second resistor and a third resistor connected in series, and connected to a corresponding voltage signal pin of the output connector via the second resistor; and
    an output pin connected to the analog-to-digital converting unit; and
  wherein the analog-to-digital converting unit comprises an analog to digital converter (ADC) comprising:
    an analog signal input pin connected to the output pin of the current detector, and grounded via a fourth resistor;
    a positive reference voltage pin connected to a node between the second resistor and the third resistor;
    a negative reference voltage pin grounded;
    a digital signal output pin connected to a first pin of the microcontroller;
    a chip selection signal pin connected to a second pin of the microcontroller; and
    a clock signal pin connected to a third pin of the microcontroller.

7. The power connection module of claim 6, wherein the switch unit comprises an electric switch comprising:
  a first terminal connected a fourth pin of the microcontroller;
  a second terminal receiving to a second voltage signal from the second power supply unit; and
  a third terminal connected to the corresponding voltage signal pin of the output connector;
  wherein the fourth pin of the microcontroller outputs a control signal to turn on the electric switch in response to the output power exceeding the rated power of the first power supply unit.

8. The power connection module of claim 7, wherein the switch unit further comprises a diode, the third terminal of the electric switch is connected to an anode of the diode, and grounded via a capacitor; a cathode of the diode is grounded.

9. The power connection module of claim 8, wherein the electric switch is an N-MOSEFT; the first terminal of the electric switch is a gate of the N-MOSEFT, the second terminal of the electric switch is a drain of the N-MOSEFT, and the third terminal of the electric switch is a source of the N-MOSEFT.

10. The power connection module of claim 8, wherein the diode is a zener diode.

11. The power connection module of claim 6, wherein the midplane is a printed circuit board.

* * * * *